US012749866B2

(12) United States Patent
Keyser et al.

(10) Patent No.: US 12,749,866 B2
(45) Date of Patent: Sep. 29, 2026

(54) DIFFERENTIAL FREQUENCY GENERATION

(71) Applicant: Government of the United States, as represented by the Secretary of the Air Force, Wright-Patterson AFB, OH (US)

(72) Inventors: Christian Keyser, Milton, FL (US); Micah Raab, Crestview, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 703 days.

(21) Appl. No.: 18/337,713

(22) Filed: Jun. 20, 2023

(65) Prior Publication Data

US 2024/0243541 A1 Jul. 18, 2024

Related U.S. Application Data

(60) Provisional application No. 63/438,750, filed on Jan. 12, 2023.

(51) Int. Cl.

| | |
|---|---|
| ***H01S 3/108*** | (2006.01) |
| ***G02F 1/35*** | (2006.01) |
| ***G02F 1/361*** | (2006.01) |
| ***G02F 1/39*** | (2006.01) |
| ***H01S 3/067*** | (2006.01) |
| ***H01S 3/20*** | (2006.01) |
| ***H01S 3/30*** | (2006.01) |

(52) U.S. Cl.

CPC .......... *H01S 3/1083* (2013.01); *G02F 1/3534* (2013.01); *G02F 1/3548* (2021.01); *G02F 1/361* (2013.01); *G02F 1/392* (2021.01); *G02F 1/395* (2013.01); *H01S 3/06729* (2013.01); *H01S 3/1086* (2013.01); *H01S 3/20* (2013.01); *H01S 3/302* (2013.01); *H01S 3/307* (2013.01)

(58) Field of Classification Search

CPC ........................................................ H01S 3/307

See application file for complete search history.

(56) References Cited

U.S. PATENT DOCUMENTS 4,927,231 A * 5/1990 Levatter ................ G02B 6/032 385/125
8,497,073 B2 7/2013 Salafsky
9,291,779 B2 3/2016 Huy et al.

(Continued)

OTHER PUBLICATIONS

Of Trevor L. Courtney et al. "Optical parametric generation in liquid- and gas-filed hollow core fibers" Proc. SPIE 11405, Optical Waveguide and Laser Sensors, 1140501 (Apr. 23, 2020) (Year: 2020).*

(Continued)

*Primary Examiner* — Minsun O Harvey
(74) *Attorney, Agent, or Firm* — AFMCLO/JAZ; Larry L. Huston

(57) ABSTRACT

A fluid filled fiber for a quasi-phase matched generator and a laser incorporating such a fluid filled fiber. The laser has a liquid filled fiber with charge transfer molecules dissolved in a solvent. The liquid of the liquid filled fiber comprises or consists essentially of highly polar liquids and/or charge transfer molecules having relatively high molecular dipole values.

18 Claims, 5 Drawing Sheets

(56) References Cited

U.S. PATENT DOCUMENTS

| | | | |
|---|---|---|---|
| 10,243,319 B1 | 3/2019 | Keyser et al. | |
| 11,374,376 B2 | 6/2022 | Keyser et al. | |
| 11,381,051 B2 | 7/2022 | Keyser | |
| 2004/0227986 A1 | 11/2004 | Kurz et al. | |
| 2008/0137696 A1 | 6/2008 | Zhang et al. | |
| 2011/0007772 A1 | 1/2011 | Popmintchev et al. | |
| 2021/0013690 A1* | 1/2021 | Keyser .................... | G02F 1/395 |

OTHER PUBLICATIONS https://phys.libretexts.org/Courses/Kettering_University/Electricity_and_Magnetism_with_Applications_to_Amateur_Radio_and_Wireless_Technology/07%3A_Capacitance/7.06%3A_Molecular_Model_of_a_Dielectric (Year: 2026).* https://en.wikipedia.org/wiki/Carbon_disulfide_(data_page)#:~:text=log10%20of%20Carbon%20disulfide,Uses%20formula:%20obtained%20from%20CHERIC (Year: 2026).*

Trevor L. Courtney, Clay Chester, Christian Keyser, "Optical parametric generation in liquid- and gas-filled hollow core fibers," Proc. SPIE 11405, Optical Waveguide and Laser Sensors, 1140501 (Apr. 23, 2020); https://doi.org/10.1117/12.2557420.

Trevor L. Courtney, Cesar Lopez-Zelaya, Patrick Hemmer, Rodrigo Amezcua-Correa, and Christian Keyser "Quasi-phase-matched electric-field-induced optical parametric amplification in xenon-filled hollow-core fibers", Proc. SPIE 11724, Laser Technology for Defense and Security XVI, 117240L (Apr. 12, 2021); https://doi.org/10.1117/12.2586117.

* cited by examiner

Table 1

| Solvent / Voltage/mm | |
|---|---|
| BTM / 10 | |
| Pump power (W) | Gain ratio |
| 25 | 3 |
| 50 | 2 |

Table 2

| Solvent / Voltage/mm | |
|---|---|
| BTM / 10 | |
| Pump power (W) | Gain ratio |
| 25 | 13 |
| 50 | 8 |
| 100 | 5 |
| 200 | 4 |
| 400 | 3 |
| 800 | 2 |

Table 3

| Solvent / Voltage/mm | |
|---|---|
| BTM / 10 | |
| Pump power (W) | Gain ratio |
| 150 | 24 |
| 200 | 23 |
| 300 | 15 |
| 400 | 13 |
| 500 | 12 |
| 600 | 11 |
| 700 | 10 |
| 800 | 9 |
| 900 | 8 |

FIG. 8

DIFFERENTIAL FREQUENCY GENERATION

CROSS REFERENCE TO RELATED APPLICATION

This application claims priority to and the benefit of provisional patent application 63/438,750 filed Jan. 12, 2023 and incorporated herein by reference in its entirety.

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to quasi phased matched nonlinear optics in fluid-filled waveguides and more particularly to such nonlinear optics as are useable for wavelength-agile fiber lasers.

BACKGROUND OF THE INVENTION

For more than 50 years, optical fibers have been used to transmit light between two longitudinally opposed ends of the fiber. Optical fibers are used in fiber-optic communications, providing transmission over longer distances and at higher bandwidths (data transfer rates) than comparable electrical cables. In 2020 one estimate is that more than 400 million km of optical fibers are produced each year for a $40B global cable market. https://www.nature.com/articles/s41467-020-19910-7.

Optical fibers have a core surrounded by a cladding, which may comprise silica cladding, which acts as a sheath for the liquid filled core. For conventional telecommunication fiber, the refractive index of the core is greater than the refractive index of the cladding. This difference in refractive indices causes light to be reflected at the interface and remain within the liquid core. As light travels through the core, the light is reflected by the cladding in a process called total internal reflection [TIR]. For low intensity light in the core that interacts with the cladding, the electron orbits within the constituent molecules are perturbed periodically with the same frequency as the electric field of the incident wave.

Referring to FIG. 1, the oscillation or perturbation of the electron cloud results in a periodic separation of charge within the molecules, which is called an induced dipole moment. The oscillating induced dipole moment is manifest as a source of EM radiation, thereby resulting in scattered light. The majority of scattered light is emitted at the identical frequency of the incident light, a process referred to as elastic scattering.

Referring to FIG. 2, additional light is scattered at different frequencies, a process referred to as inelastic scattering. Raman scattering is one example of inelastic scattering which is of particular interest due to thermal population of vibrational states. Raman scattered light is converted to a longer wavelength dependent on the vibrational frequency of the medium. Rayleigh scattered wavelengths are similar to the incident field wavelength and the scattering is stronger for shorter wavelengths. vs Rayleigh scattering which has shorter wavelengths than the incident wavelengths. vs Rayleigh scattering which has shorter wavelengths than the incident wavelengths.

Raman gain, also known as Raman amplification, is based on the stimulated Raman scattering (SRS) phenomenon, when a lower frequency ‘signal’ photon induces the inelastic scattering of a higher-frequency pump photon in an optical medium in the nonlinear regime. As a result of this, another ‘signal’ photon is produced, with the surplus energy resonantly passed to the vibrational states of the medium. This process, as with other stimulated emission processes, allows all-optical amplification. Raman gain occurs only at the vibrational frequency of the medium and thereby provides limited ability to convert a pump laser to arbitrary wavelengths. For example, common silica fiber has a Raman shift of ~440 $cm^{-1}$, causing to new wavelengths to occur relatively close to the old wavelength. But silica fibers have low polling periods, requiring large fiber diameters leading to low nonlinearity or alternatively requiring very long fibers, and attendant losses) to increase the polling period. Since SRS has no phase matching condition SRS can act as a parasitic process stealing energy away from other more desirable processes. Silica fiber dispersion and diameter lead to small polling periods, and therefore small QPM period/electrode separation ratios making QPM nonlinear interactions in conventional silica fiber impractical. Additionally, the small period/electrode separation ratio, where the electrode separation ratio is limited by the fiber diameter, are difficult to fabricate with the necessary period consistency and accuracy. Such low nonlinearity and period/electrode separation ratios require longer fiber lengths with attendant losses.

One advance in fiber optics is to replace a solid glass core with a liquid filled core. The liquid filled core enables customization of fiber optical properties that can be used to more specifically control nonlinear interactions. For example liquid mixtures can be selected to attain lower dispersion than silica fibers, better mid-IR transmission, and tailored nonlinearity. But, as gas nonlinearity decrease, fiber length must increase in inverse proportion causing greater line losses. All transparent glass presents a broad spectral window in the visible and near infra-red spectra, between the ultraviolet (electronic) and infra-red (vibrational) absorption peaks. Earlier advances in the art suppressed absorptions from metallic impurities and hydroxyl overtones by reducing impurities in the glass to part per billion levels. Residual loss in this spectral region is intrinsically caused by scattering due to local density fluctuations and Rayleigh scattering.

Quasi-Phase Matched (QPM) Nonlinear Optics in liquid-filled (LF) fibers and/or liquid-filled (LF) waveguides are usable for wavelength-agile fiber lasers (WAFL) and wavelength-agile quantum resources (WAQR). The capability to mix different liquids in hollow waveguides advantageously provides control of transmission, dispersion and nonlinearity. These properties can enable WAFLs operable at visible wavelength to short wavelength IR (SWIR) 780 to 2000 nm in specific windows from SWIR to mid infrared (MIR) to 5000 nm wavelengths that are liquid dependent. This type source could be useful for applications such as LiDAR, IRCM, eye-safe lasers, free-space communications, laser surgery and machining, and quantum networks.

Second order nonlinear processes, such as difference frequency generation and spontaneous parametric down conversion, may be employed in nonlinear crystals for wavelength conversion and generation of entangled/unentangled photon pairs, respectively. Efficient operation requires that the nonlinear medium have a second order nonlinearity, $\chi^{(2)}$ and that the phase matching condition is met. Although crystals may have large $\chi^{(2)}$ values, fiber and waveguide geometries are more attractive for laser wavelength conversion and quantum networks due to their compactness, opto-mechanical robustness, simple network integration, and improved conversion efficiency. Amorphous medium, such as liquids and glass do not have a $\chi^{(2)}$, however, it can be induced in a polar liquid by aligning the molecular dipoles with the externally applied electrostatic field. Doped charge transfer (CT) molecules exhibiting high nonlinearity in solid polymer matrices of waveguides and applied an electric field may be used to orient the charge transfer molecules (CTM) which act as a dopant to create a $\chi^{(2)}$. But all such solid matrices are prone to optical loss due to scattering.

Particularly, stimulated Raman scattering (SRS) ($gain_{SRS} \sim\chi^{(3)}\propto\gamma_{vib}$) presents the problem of competing with the optical parametric amplification and generation (OPA/G) ($g_{OPA/G}\propto\chi(2)\propto\mu\beta$) where μ and β are the molecular dipole and first hyperpolarizability. Furthermore, QPM OPA/G are specific cases of difference frequency generation, in fibers according to the prior art (e.g. solid silica, chalcogenide) are challenging because $$\frac{\Lambda}{D}$$

is relatively small where Λ is the QPM electrode period and D is the separation distance between opposing distance electrodes on either side of the fiber/waveguide. This small $$\frac{\Lambda}{D}$$

is driven by the high dispersion of solids. In contrast liquid filled fibers naturally have lower dispersion favoring larger $$\frac{\Lambda}{D}$$

which increases the QPM OPA/G effectiveness.

By using high μβ liquid filled fiber and achieving large $$\frac{\Lambda}{D}$$

according to the present invention, LCF can enable high gain QPM OPA/G that does not suffer from parasitic SRS. Given the needs of WAFL operating from visible to mid-IR QPM OPA/G can be an effective tool for high power applications.

Relatively high power applications are needed for LIDAR at certain distances. For example, at a target distance of 700 meters a pump power of at least approximately 1 kw is required. Given the disparate wavelengths necessary for integration of fiber (~1550 nm) and free-space (~780 nm) networks with quantum memory (~400 nm-700 nm), it can be seen that there is a need for wavelength-agile generation of entangled/unentangled photon pairs and quantum frequency conversion while mitigating the problem of parasitic Raman scattering.

SUMMARY OF THE INVENTION

In one embodiment the invention comprises a laser which has a LF fiber which sufficiently increases $\chi^{(2)}$ of the liquid ($\chi^{(2)}\sim\mu\beta$) such that the QPM OPA/G gain is greater than the SRS gain. The relative values of this ratio may be obtained by dissolving charge transfer molecules in a solvent suitable for the liquid. In another embodiment, the liquid of the LF fiber, or polymer fiber, comprises or consists essentially of highly polar liquids and/or charge transfer molecules (CTM) having high values of μ.

The differential frequency generation (DFG) genus of the present invention includes two species: optical power management (OPM) amplification (OPMA) and optical power management (OPM) generation OPMG. OPMA and OPMG convert a pump wavelength signal to a longer wavelength signal plus idler fields. Difference frequency generation generally involves mixing two fields in a second order nonlinear medium. The OPMA species involves coupling a higher power pump field into the nonlinear medium with a weak seed signal to be amplified. The OPMG species only shines the higher power pump field into the nonlinear medium where this field mixes with signal or idler photons generated from quantum noise.

BRIEF DESCRIPTION OF THE DRAWINGS

FIG. 8 represents three tables of the QPM/DFG Gain of Raman Scattering corresponding to different voltage potentials.

DETAILED DESCRIPTION OF THE INVENTION

Figure 1:
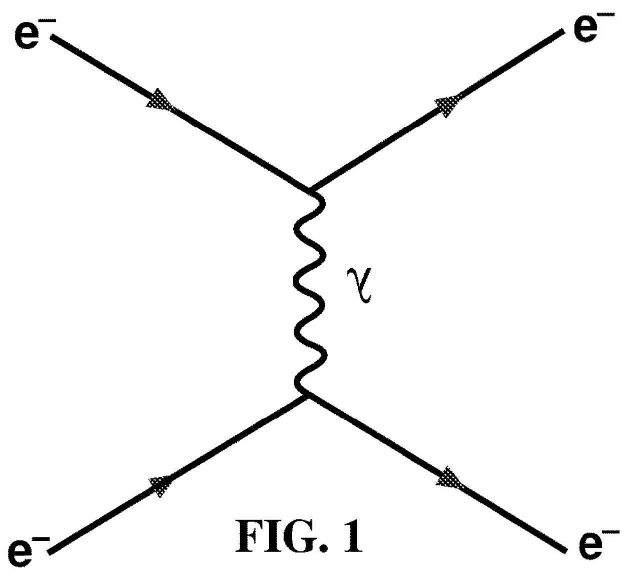
FIG. 1 is a Feynman diagram of scattering between two electrons by emission of a virtual photon.
Figure 2:
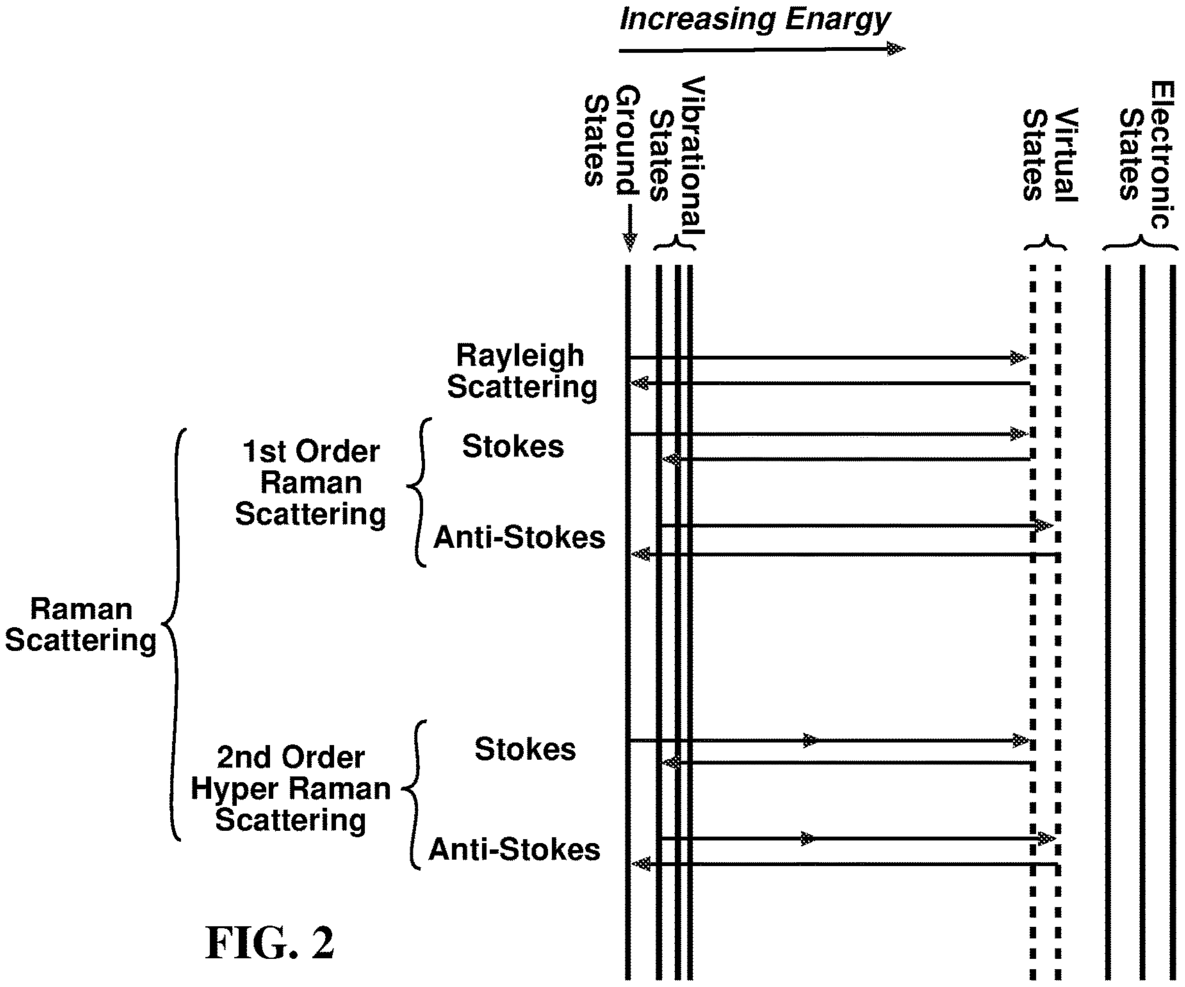
FIG. 2 is a Jablonski energy level diagram schematically representing Rayleigh and Raman scattering processes for a hypothetical analyte.
Figure 3:
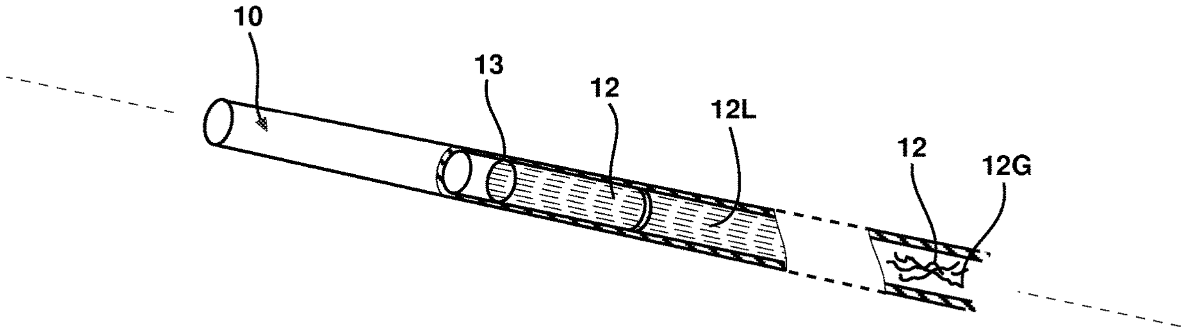
FIG. 3 is a perspective view, shown partially in cutaway, of a fluid filled fiber according to the present invention of indeterminate length and showing the fluid can be either a liquid or gas.

Referring to FIG. 3, a longitudinally elongate liquid 12L filled optical fiber 10 according to the present invention comprises a hollow core fillable with a fluid 12. The fluid 12 may be a liquid 12L or a gas 12G, as described herein whereby the invention excludes solid core fibers 10. The core is encased by a cladding 13 which is preferably concentric with the core. The cladding 13 may be encased by a protective jacket, in known fashion and which is preferably concentric with the cladding 13. The index of refraction of the liquid 12L determines which type of waveguide is feasible. For example, total internal reflection fibers 10/waveguides require $n_{core}>nc_{ladding}$, whereas anti-resonant hollow-core fiber 10 and hollow dual bandgap photonic crystal fibers 10 require $n_{core}<nc_{ladding}$. The hollow fiber 10 may be filled with one of a liquid 12L which typically yields Λ from 100 μm to 1000 μm, and a period error σ tolerance from 0.1 μm to 10 μm, or with a gas 12G with Λ from 1000 μm to 10000 μm, and σ from 1.0 μm to 10 μm. Generally, as fiber interaction length increases, the allowed period error σ decreases.

Figure 4:
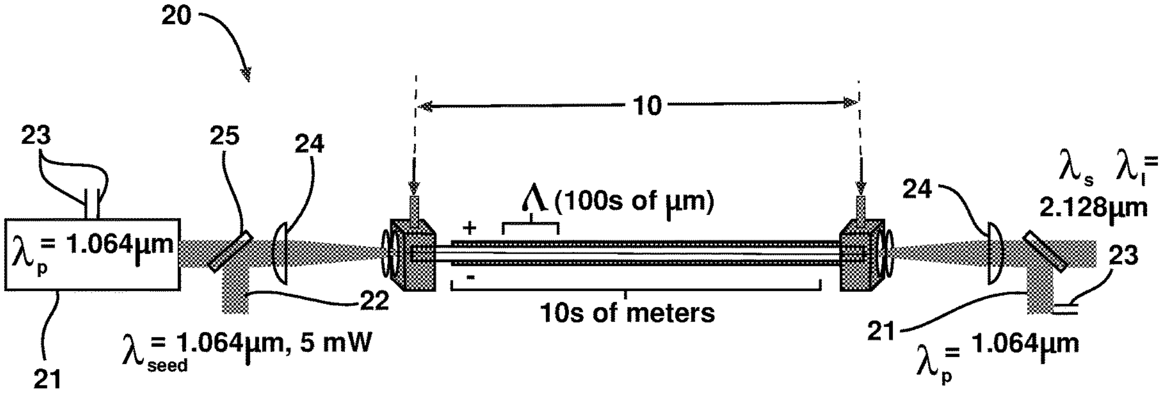
FIG. 4 is a schematic side elevational view of a nonlimiting, exemplary laser according to the present invention.

Referring to FIG. 4, the optical parametric amplifier 20 according to the present invention may be a laser 21. A laser 21 according to the present invention comprises a light source, one or more dichroic beam combiner and splitter 25 and lenses 24 as helpful for the particular configuration and a light transmitting fiber. The fiber 10 has a cladding 13 surrounding a core therein wherein $n_{core}>n_{cladding}$. The light source may be a pump laser 21. The pump laser 21 may be augmented by a seed laser 22 for QPA. The seed laser 22 is not used for QPG. The pump laser 21 may have an associated pump power of at least 500 W with a 40 micron core fiber 10 to provide a ratio of ub/gamma to greater than 8*10^-14 statvolts^2. The mu*beta/gamma term is independent of the pump power and fiber core. However, the resulting gain for QPM OPA and SRS is dependent on pump power and fiber core.

The LFF 10 is located between two periodic electrodes 23 with a period Λ. The periodic electrodes 23 produce a periodic electrostatic field along the LFF 10 length enabling QPM. QPM difference frequency generation (DFG) gain G. DFG occurs as the difference in frequency between two electric fields, producing a third electric field. DFG gain may be implemented through OPA where a weak signal is amplified to produce a third field. DFG may also be implemented through OPG where a single high power field is present. In OPG quantum noise produces random photons which mixes with the single high power field to provide amplification. The DFG gain may depend upon the effective nonlinearity $\chi^{(2)}$ through the component of the electrode 23 electrostatic field ($E_{DC,y}$) parallel to a pump laser 21 polarization. Accordingly the liquid 12L filled fiber 10, as optionally doped as described herein, of the present invention enables a Λ/D ratio suitable to increase $E_{DC,y}$.

The fiber 10/waveguide may be a hollow channel, photonic crystal structure or slot waveguide. In one embodiment, the liquid 12L of the LF fiber 10 has a nonlinear molecule with a μβ of at least 2000 esu $10^{-48}$, preferably at least 3000 esu $10^{-48}$, at least 5000 esu $10^{-48}$, preferably at least 10000 esu $10^{-48}$ but not more than 100000 esu $10^{-48}$ in order to be adequately greater than the μβ of bromotrichloromethane or other fluid 12 in the fiber 10. The molecule may have a negative bond length alternation (BLA), corresponding to a sufficiently large value for the molecular dipole, μ, k is Boltzmann constant, T is temperature and γ is the $2^{nd}$ hyperpolarizability ($\chi^{(3)}\propto N*\gamma$) as is normally associated with $3^{rd}$ order nonlinear optics and N is molecular density.

The averaged difference of bond lengths within the bridge is called bond length alternation (BLA) and ranges between approximately −0.12 to +0.12 Å. Bond length alternation is a measure of molecular geometric structure defined as the average of the difference in the length between adjacent carbon-carbon bonds in a polymethine ((CH)n) chain. The BLA can be determined by the dielectric constant of the liquid 12L in the core. The desired dielectric constant can be achieved by properly selecting a solvent for the liquid 12L in the core of the optical fiber 10.

The molecule may exist in a state of superposition between neutral and zwitterionic. In such molecules having a negative BLA, the neutral structure is predominant in the ground electronic state while the charge transfer structure dominates an excited electronic state. The resulting difference in dipole moment (Δμ) between the two electronic states may provide advantageously large values for β, where $\mu_{ge}$ is the transition dipole moment between the states and E is the energy difference between the ground and excited state. A BLA value of +/−0.045 Å provides a sufficiently large value of β and a sufficiently small value of γ, thereby increasing the ratio of β/γ. CT molecules unexpectedly provide nonlinear gain orders of magnitude greater than periodically poled lithium niobate (PPLN), a domain-engineered lithium niobate crystal used for achieving quasi-phase-matching in nonlinear optics according to the prior art. CT Molecules can provide very large QPM DFG gain. Given the potential for long fiber interaction length, CT molecules may enable LCF to be competitive with workhorse bulk nonlinear crystals such as PPLN.

Figure 5:
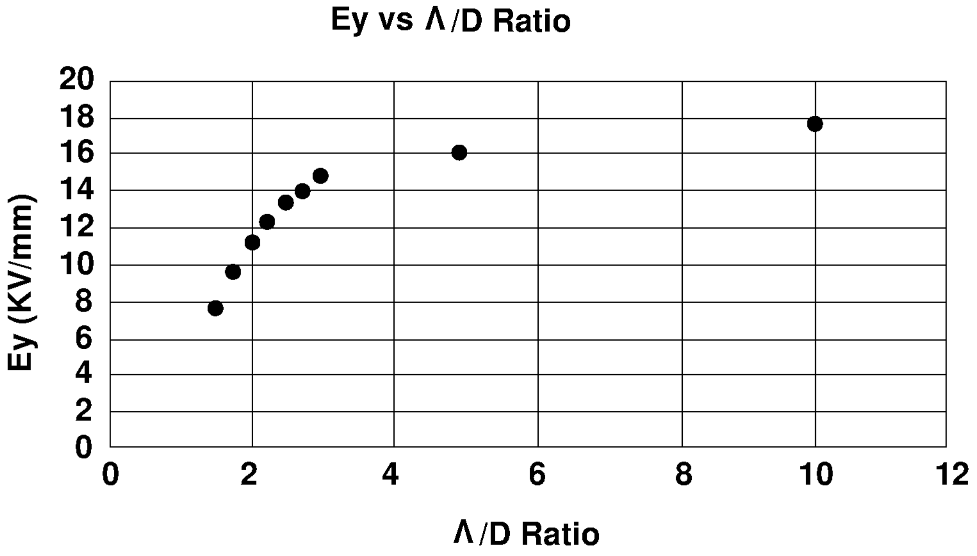
FIG. 5 is a graphical representation of the effect of electrode period to separation distance ratio on electrostatic field for an exemplary 93% bromotrichloromethane/7% perfluorohexane mixture.

Referring to FIG. 5, the liquid 12L of the LF fiber 10 may have a dielectric constant from 1 to 40, 1.5 to 7.5, 2 to 7 or 2.5 to 6.5 for control of hyperpolarizability β. The liquid 12L may comprise one or more NIR transmissive solvents hydrogen free, polar solvents, and more particularly are charge transfer molecule (CTM) solvents. Polar liquids are suitable for use with OPA. Adding CTM to the polar liquid makes it suitable for OPA or OPG. Particularly, the solvents may be selected from the group consisting of bromotrichloromethane, perfluorohexane, trichloroacetonitrile, acetonitrile, trichloroacetontricle, hexachloroacetone and combinations thereof. The liquid 12L may comprise from 80 w/% to 95 w/% bromotrichloromethane and from 5 w % to 15 w/% perfluorohexane. The nonlinear molecule and solvent(s) may be combined to provide a solvent mixture having a dielectric constant of at least 1.5, 2 or 2.5 with a maximum in order to provide sufficiently large values for β and provide that QPM DFG gain is greater than SRS gain.

The present invention applies a spatially varying electric field across liquid 12L filled fibers 10 to simultaneously achieve quasi-phase matching (QPM) and an effective $\chi^{(2)}$. QPM is a technique which employs an electrostatic field with the appropriate spatial modulation to meet the phase matching condition and enable efficient transfer of energy from the pump laser 21 to the desired signal and idler fields. The QPM condition is $$\Delta k - \frac{2\pi}{\Lambda} = k_p(\lambda_p) - k_s(\lambda_s) - k_i(\lambda_i) - \frac{2\pi}{\Lambda} = 0$$

where the propagation constant is $k_x=k_{o,x}*n_{eff}(\lambda_x)$, $k_{o,x}$ is the vacuum propagation constant at $\lambda_x$, $n_{eff}(\lambda_x)$ is the effective index of refraction due to the liquid 12L filled fiber 10 or waveguide and $$\frac{2\pi}{\Lambda}$$

is spatial frequency of the periodic electrode 23 with period Λ and Δk is the phase mismatch due to the LF design that is correctable by application of the QPM. Generally, a generator 20 according to the present invention may satisfy deff,QPM DFG=k*χ(2)/2 where k is a geometric factor related to the QPM electrostatic field distribution. The ability to select different liquids or to mix different liquids for the liquid fill 12L allows for potential tunability of the polling period, which tunability is infeasible in a solid matrix according to the prior art.

For appropriate transmission the LF fibers 10 and waveguides are chosen to have sufficiently high transmission at relevant wavelengths. For example, short-wave to mid-wave IR applications can benefit from hydrogen free molecules as H-X modes are a major source of absorption in that spectral range.

Figure 6:
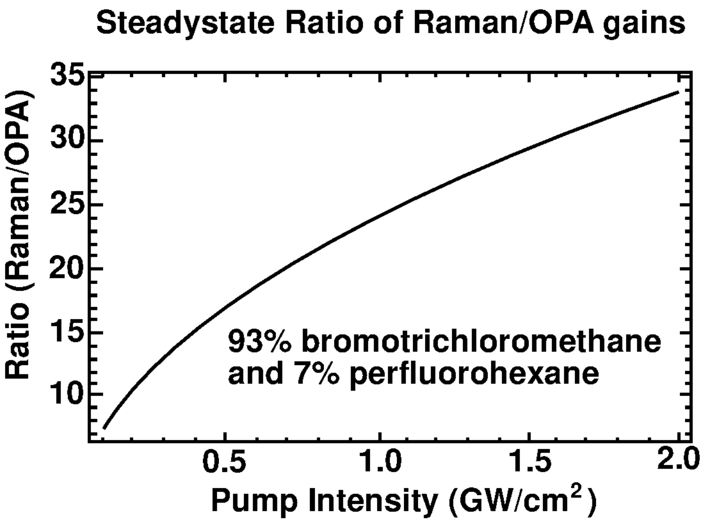
FIG. 6 is a graphical representation of the influence of pump power on the ratio of QPM OPG gain/SRS gain vs laser pump power for several cases.

Referring to FIG. 6, for the appropriate electrode 23 period, the liquid 12L solvent and waveguides or fibers 10 are chosen to enable conveniently manufacturable electrodes 23. The prior art silica fibers exhibit Λ/D ratios<1.5. But according to the present invention Λ/D>2.3 may provide efficient QPM difference frequency generation (DFG) and optical parametric amplification, where D is the separation distance between opposing electrodes 23 as described above. Fiber 10 or wave guide diameter is preferably <Λ/2.3. Since QPM period is preferably $$\Lambda = \frac{2\pi}{\Delta k},$$

the polling period is advantageously determined by the dispersion of the LF. Practical considerations of liquid 12L dispersion set the maximum Λ~2000 um and fiber 10 diameter that set the minimum D~3 um to yield a ratio in the range of $$2.3 \le \frac{\Lambda}{D} \le 666.7$$

and preferably in the range of 3 to 650 and more preferably 5 to 600 for efficient operation. A maximum allowable fringing threshold can be ascertained by requiring a minimum conversion efficiency of 60% in the limit of no loss, un-depleted pump, and perfect phase matching. The electrode 23 period error is preferably maintained to ~0.1-1.0%*Λ. Since the polling period is defined by the combined LCF dispersion, different LCF designs yield different polling period. The Λ range and allowed σ as follows: solid fiber (Λ~10-100 μm, σ~0.01-1.0 μm), liquid 12L HCF (Λ~100-1000 μm, σ~0.1-10 μm), and gas 12G HCF (Λ>1000 μm, σ>1.0 μm). A liquid 12L filled fiber 10 is attractive for QPM DFG as Λ and σ are more relaxed and high nonlinearity is still attainable.

The breakdown strength of the LF fiber 10 and liquid 12L are sufficient to prevent breakdown of the electric field strength applied for QPM. Since higher electrostatic fields generally yield higher $\chi^{(2)}$ values, LF with relatively high breakdown strengths are suitable. Similarly, since high power lasers 21 are typically used to pump the QPM LF, the LF needs a sufficiently high optical intensity breakdown threshold. If one of skill approximates the $E_{DC,y}(z)$ as sinusoidal, the QPM prefactor is approximately k~0.5. For QPM DFG to dominate over SRS in the gain competition the ratio of gains is greater than one: $G_{QPM,DFG}/G_{SRS}>1$. The QPM gain is greater than the Raman gain.

Figure 7:
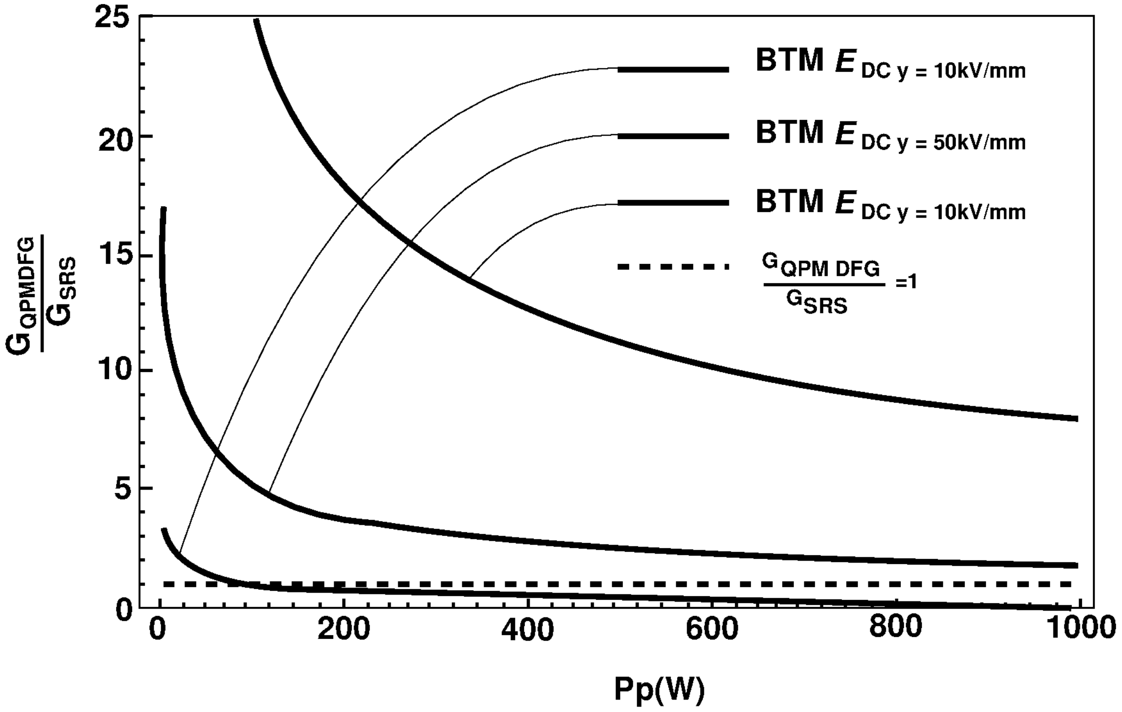
FIG. 7 is a graphical representation of the effect of electrode wattage on differential electric field gain for three different liquids.

Referring to FIG. 7, the differential electric field gain ratios for a 40 um core liquid 12L filled fiber 10 with 106 um outer diameter, Λ~320 um, $$\frac{\Lambda}{D} \sim 3,$$

and a 1.06 um wavelength pump laser 21 converted to 2.12 um wavelength output laser 21 are shown. Bromotrichloromethane (BTM) with electrode 23 voltage yielding $E_{DC,y}$~10 kV/mm and 50 kV/mm are specifically examined in a non-limiting example. It is believed that the higher field case is best attained using short (<10 us voltage pulses). These results show that polar solvents benefit from high voltage operation and lower pump power. But low pump power may be unattractive as requiring inversely proportional longer fiber 10 length, thereby increasing sensitivity to liquid 12L loss and complicating electrode 23 design. The inclusion of charge transfer molecule (CTM) according to the present invention (and optional moderate field strength) advantageously allows the ratio to exceed 1 even for high pump power which tends to favor SRS gain over QPM DFG gain in conventional polar solvents. A further benefit of the invention is the inversely proportional relationship providing that greater the ratio of the differential electric field gain, the shorter the LF fiber 10 can be. A ratio of 25*10^-52<μβ<5*10^-42 esu is believed to be advantageous for the claimed invention.

FIG. 7 shows that as the Λ/D ratio approaches 1, the needed fiber length increases. But if one of skill wants to operate at higher power levels, e.g. to image a target scene at a greater distance, the power must also increase in nonlinear fashion. One suitable execution without CTM is a 50:50 mixture of bromotrichloromethane (BTM) and trichloroacetonitrile (TCN). One suitable execution with CTM is a 2:3 mixture of bromotrichloromethane (BTM) and trichloroacetonitrile (TCN). The ratio of the gain of QPM/DFG to the gain of the Raman scattering SRS is advantageously greater than 1 for three different BTM and CTM filled fibers 40.

The fiber 10 may have a predetermined length overlapping both electrodes 23. For DFG comprising OPA without the benefit of CTM, a fiber 10 having a length of 0.2 M to 1 M and preferably 0.3 M to 0.4 M to increase signal output. Prophetically, for DFG comprising OPA with the benefit of CTM, a fiber 10 having a length of 0.02 M to 0.2 M is believed suitable.

For DFG comprising OPG with the benefit of CTM, a fiber 10 having a length of 0.08 M to 0.4 M is believed to be suitable. DFG comprising OPG without the benefit of CTM is believed to be infeasible for and outside of the present invention.

Referring to FIG. 8, Table 1 shows an approximate relationship between the ratio of the Gain of QPM/DFG to the Gain of the Raman scattering SRS for a 40 micron fiber 40 BTM with a 10 kV/mm potential. It can be seen that for this execution gain ratios of about 3 and 2 advantageously occur with pump powers of 25 and 50 watts, respectively.

Referring to FIG. 8, Table 2 shows an approximate relationship between the ratio of the Gain of QPM/DFG to the Gain of the Raman scattering SRS for a 40 micron fiber 40 BTM with a 50 kV/mm potential. It can be seen for this execution gain ratios of about 13, 8, 5, 4, 3, and 2 advantageously occur with pump powers of 25, 50, 100, 200, 400 and 800 watts, respectively.

Referring to FIG. 8, Table 3 shows an approximate relationship between the ratio of the Gain of QPM/DFG to the Gain of the Raman scattering SRS for a 40 micron fiber 40 CTM with a 10 kV/mm potential. It can be seen that for this execution gain ratios of about 24, 23, 15, 13, 12, 11, 10, 9 and occur with pump powers of 150, 200, 300, 400, 500, 600, 700, 800 and 900 watts, respectively.

FIG. 8 shows the maximum pump power can be 900 watts or 1000 watts and still provide a ratio of the Gain of QPM/DFG to the Gain of the Raman scattering SRS greater than 1, preferably greater than 5 and more preferably greater than 8. The applied voltage may be as high as 10 kV/mm, 50 kv/mm, 75 kV/m or 100 kV/mm.

Using the present invention parasitic Raman scattering is suppressed—thereby overcoming a major challenge as amorphous media (glass, gas 12G, liquid 12L) typically and intrinsically have large Raman gain and weak second order nonlinearity. The present invention overcomes this problem through selection and engineering of molecules to yield large dipole and $1^{st}$ hyperpolarizability (or $\chi^{(2)}$) while having small imaginary $2^{nd}$ order hyperpolarizability (or $Im[\chi^{(3)}]$). Particularly, one suitable approach to suppressing Raman scattering uses polar liquids 12L yielding relatively large values of $\chi^{(2)}$ and Raman output power less than 1 W and preferably less than 1E-3 W. Also, one may dissolve molecules in such solvents to increase $\chi^{(2)}$ relative to $\chi^{(3)}$ achieving a sufficiently large $\chi^{(2)}/\chi^{(3)}$ ratio, or a large $\mu\beta/\chi^{(3)}$ ratio.

All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range of that same parameter. That is the upper limit of one range may be used with the lower limit of another range, and vice versa. While particular embodiments of the present invention have been illustrated and described, it would be obvious to those skilled in the art that various other changes and modifications can be made without departing from the spirit and scope of the invention. It is therefore intended the appended claims cover all such changes and modifications that are within the scope of this invention.

What is claimed is:

1. A liquid filled quasi-phase matched optical parametric amplification fiber laser comprising:

a light source in optical communication with a light transmitting fiber having a cladding and a liquid filled core therein, the liquid being a polar liquid adapted for OPA wherein the liquid further comprises Zwitterionic molecules, the fiber having a Λ/D value ranging from 2.3 to 666.7.

2. A fiber laser according to claim 1 wherein the liquid further comprises imidazolium ionic liquids having dipole moments from 12 D to 14 D.

3. A fiber laser according to claim 2 wherein the liquid is free of dopant.

4. A fiber laser according to claim 1 wherein the liquid has a dielectric constant ranging from 1 to 40.

5. A fiber laser according to claim 4 wherein the liquid comprises from 80 w/% to 95 w/% bromotrichloromethane and from 5 w % to 15 w/% perfluorohexane.

6. A fiber laser according to claim 1 wherein wherein $n_{core}>n_{cladding}$.

7. A fiber laser according to claim 1 wherein wherein $n_{core}<n_{cladding}$.

8. A fiber laser according to claim 1, wherein the liquid further comprises charge transfer molecules having a bond length alternation from −0.045 to +0.045 whereby the liquid is configured for OPA and OPG.

9. A difference frequency generator comprising:

a light source in communication with a hollow core fiber, the hollow fiber being filled with at least two mixed liquids not having mutually overlapping Raman lines, one said liquid with Λ from 100 μm to 1000 μm, and σ from 0.1 μm to 10 μm, and a gas with Λ from 1000 μm to 10000 μm, and σ 1 from 1.0 μm to 10 μm;

two spaced apart electrodes configured to enable second order wave mixing the liquid or gas inside the hollow fiber, and having an electrode period of 0.1-10.0% of Λ.

10. A generator according to claim 9 satisfying the equation:

$$deff,\ QPM\ \ DFG=k^{*}\ \chi(2)/2.$$

11. A generator according to claim 10 wherein Λ/D ranges from 3 to 500 and D is the separation distance between electrodes in microns.

12. A method of making a liquid filled quasi-phase matched optical parametric amplification fiber laser comprising the steps of:

selecting a nonlinear liquid charge transfer molecule having a uB ranging from 2 to E-48 esu to 2 E-40 esu;

selecting a transmissive solvent;

combining the nonlinerar liquid charge transfer molecule and the NIR transmissive solvent to yield a liquid having a dielectric constant of 1.5 to 7.5 to thereby provide a QPM OPA/G gain/SRS gain ratio greater than 1; and disposing the liquid in a light transmitting fiber in optical communication with a light source.

13. A method according to claim 12 wherein the solvent is NIR transmissive.

14. A method according to claim 13 wherein the solvent is transmissive to light having a wavelength of 0.8 to 10 microns.

15. A method according to claim 14 wherein the solvent is transmissive to light having a wavelength of 1 to 2 microns.

16. A method according to claim 15 wherein the solvent is selected from the group consisting of bromotrichloromethane, perfluorohexane, trichloroacetonitrile and combinations thereof.

17. A method according to claim 15 wherein the solvent consists of at least 40% BTM.

18. A method according to claim 14 wherein the liquid is free of zwitterionic dopant.

* * * * *